United States Patent
Xu et al.

(10) Patent No.: US 10,110,106 B2
(45) Date of Patent: Oct. 23, 2018

(54) VIBRATION MOTOR WITH COIL AND TWO SETS OF MAGNETS FOR IMPROVING VIBRATION INTENSITY

(71) Applicants: Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 196 days.

(21) Appl. No.: 15/011,494

(22) Filed: Jan. 30, 2016

(65) Prior Publication Data

US 2017/0012515 A1   Jan. 12, 2017

(30) Foreign Application Priority Data

Jul. 8, 2015   (CN) ..................... 2015 2 0488669 U

(51) Int. Cl.
*H02K 33/00* (2006.01)
*H02K 33/02* (2006.01)
(Continued)

(52) U.S. Cl.
CPC .............. *H02K 33/00* (2013.01); *H02K 1/34* (2013.01); *H02K 33/02* (2013.01); *H02K 33/16* (2013.01); *H02K 35/02* (2013.01)

(58) Field of Classification Search
CPC ........ H02K 33/00; H02K 33/02; H02K 33/04; H02K 33/08; H02K 33/10; H02K 33/12;
(Continued)

(56) References Cited

U.S. PATENT DOCUMENTS

| 2008/0165450 A1* | 7/2008 | Binnard | H02K 41/0356 360/123.01 |
| 2011/0018365 A1* | 1/2011 | Kim | B06B 1/045 310/17 |
| 2016/0254736 A1* | 9/2016 | Jin | H02K 33/16 310/25 |

FOREIGN PATENT DOCUMENTS

JP        2002143770 A  *  5/2002

OTHER PUBLICATIONS

Wakiwaka Hiroyuki; Kato Hisayuki, Vibration Generator, May 21, 2002, Teikoku Tsushin Kogyo Co LTD, JP 2002143770 (English Machine Translation).*

* cited by examiner

*Primary Examiner* — Bernard Rojas
*Assistant Examiner* — Alexander Singh
(74) *Attorney, Agent, or Firm* — Na Xu; IPro, PLLC

(57) ABSTRACT

A vibration motor is provided in the present disclosure. The vibration motor includes a stationary part, a vibration part and an elastic connector. The stationary part includes a housing providing an accommodating space. The vibration part is suspended within the accommodating space by the elastic connector. The stationary part comprises a coil, and the vibration part comprises a first magnet set and a second magnet set; the first magnet set and the second magnet set are respectively disposed at two opposite sides of the coil to generate a closed magnetic loop. The first magnet set includes a first left magnet, a first middle magnet and a first right magnet, the second magnet set includes a second left magnet, a second middle magnet and a second right magnet which are opposite to the first left magnet, the first middle magnet and the first right magnet respectively.

6 Claims, 4 Drawing Sheets

(51) Int. Cl.
*H02K 35/02* (2006.01)
*H02K 33/16* (2006.01)
*H02K 1/34* (2006.01)

(58) Field of Classification Search
CPC ........ H02K 33/14; H02K 33/18; H02K 33/16;
H02K 35/00; H02K 35/02; H02K 35/04;
H02K 35/06; H02K 1/34
USPC ......... 310/12.01, 12.14, 12.15, 12.16, 12.21,
310/12.22, 12.24, 12.25, 12.26, 12.27,
310/12.31, 12.32, 12.33
See application file for complete search history.

VIBRATION MOTOR WITH COIL AND TWO SETS OF MAGNETS FOR IMPROVING VIBRATION INTENSITY

FIELD OF THE DISCLOSURE

The present disclosure relates to vibration motor technologies, and more particularly, to a vibration motor applicable to a mobile device.

BACKGROUND

With development of mobile electronic technology, mobile devices, such as mobile phones, handheld game players, navigation devices, handheld multimedia entertainment apparatuses, or the like, become more and more popular. Generally, the mobile devices use vibration motors to provide system feedback, such as incoming call or message prompting in a mobile phone, or vibration feedback in a potable game player.

In a related vibration motor, a magnet is provided at one side of a coil; however, the one-side magnet configuration may causes a magnetic field in the vibration motor to be divergent when the vibration motor operates, and thus an intensity of the magnetic field is too weak to generate sufficient driving force for driving the vibration motor to perform vibration. Accordingly, the vibration motor may be incapable for providing good system feedback for the mobile device.

Accordingly, it is necessary to provide a new vibration motor to overcome the aforesaid drawbacks.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
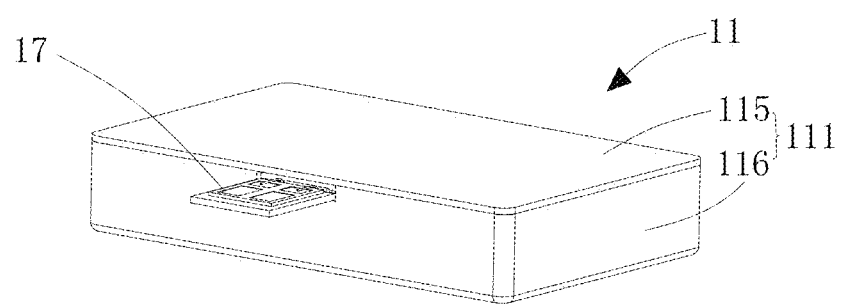
FIG. 1 is a schematic assembled view of an embodiment of a vibration motor according to the present disclosure.
Figure 2:
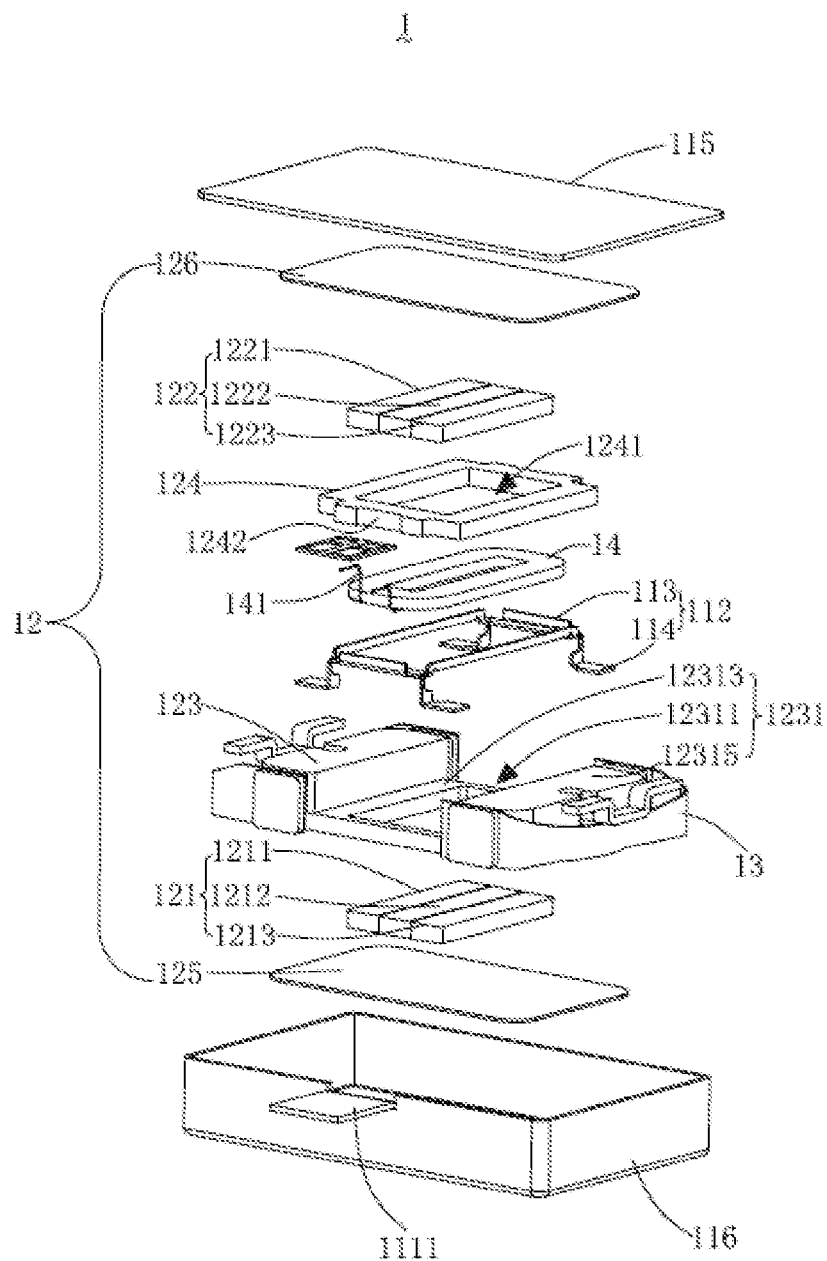
FIG. 2 is an exploded view of the vibration motor of FIG. 1.
Figure 3:
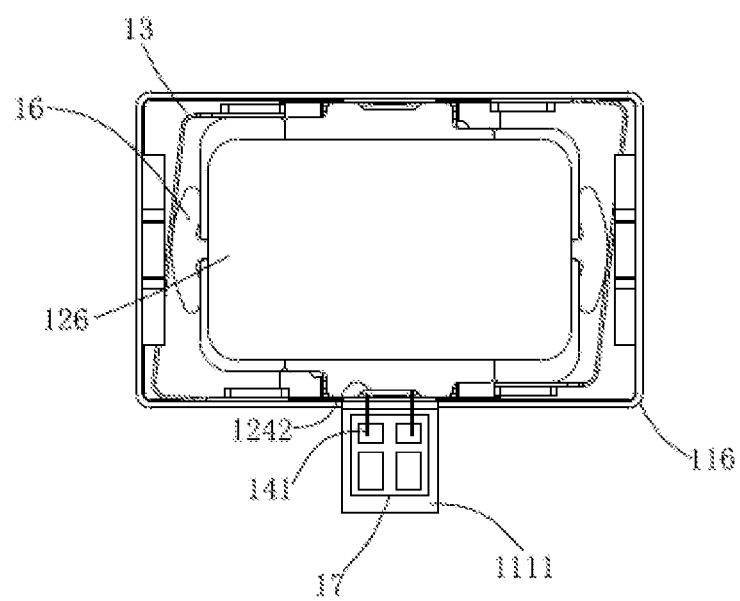
FIG. 3 is a partial top view of the vibration motor of FIG. 1.

Referring to FIGS. 1-3, a vibration motor 1 according to an embodiment of the present disclosure is shown. The vibration motor 1 includes a stationary part 11, a vibration part 12 and an elastic connector 13

The stationary part 11 includes a housing 111 providing an accommodating space and an extending platform 1111 extending outwards from the housing 111, the housing 111 includes a top cover 115 and a casing 116. The top cover 115 covers the casing 116 for forming the accommodating space. The extending platform 1111 may extend outwards from the casing 116. Alternatively, the extending platform 1111 may extend outwards from the top cover 115. The vibration part 12 is suspended within the accommodating space by the elastic connector 13.

The vibration part 12 includes a first mass block 123, a first magnet set 121 accommodated within the first mass block 123, a second mass block 124, a second magnet set 122 accommodated within the second mass block 124, a first pole plate 125 adjacent to the first mass block 123, and a second pole plate 126 adjacent to the second mass block 124.

The first mass block 123 has a groove 1231 formed at a central of a main body thereof, the groove 1231 may be cooperatively formed by a bottom 12313 and two sidewalls 12315 extending from two opposite sides of the bottom 12313. The bottom 12313 includes a first through hole 12311 for receiving the first magnet set 121. The first pole plate 125 is attached to a surface of the bottom 12313 that is away from the second mass block 124.

The second mass block 124 is placed in the groove 1231 and is clamped between the two sidewalls 12315. The second mass block 124 is separated from the bottom 12313 at a certain distance, and may have a plate shape. The second mass block 124 includes a second through hole 1241 for receiving the second magnet set 122 and a recess portion 1242 corresponding to the extending platform 1111. The second pole plate 126 is attached to a surface of the second mass block 124 that is away from the bottom 12313.

In the present embodiment, the first mass block 123 and the second mass block 124 are two separate components; alternatively, the first mass block 123 and the second mass block 124 may be formed integrally into a one-piece component.

The elastic connector 13 includes a pair of U-shaped elastic connecting members for suspending the two ends of the first mass block 123 into the housing 111 respectively. Specifically, each of the U-shaped elastic connecting members has a first end connected to the housing 111, and a second end connected to a corresponding end of the first mass block 123.

The stationary part 11 further includes a coil 14 and a coil support 112 fixed within the housing 111. The coil support 112 includes a supporting portion 113 for supporting the coil 14, and a plurality of supporting legs 114 bent and extending from four corners of the supporting portion 113 respectively. Bottom of the supporting legs 114 is fixed to the housing 116. The coil 123 is supported by the supporting portion 113, and the supporting portion 113 is positioned between the first mass block 123 and the second mass block 124.

Furthermore, the vibration motor 1 further includes a pair of dampers 16 and a flexible printed circuit board 17. Each of the dampers 16 is positioned between one of U-shaped elastic connecting members of the elastic connector 13 and a corresponding end of the first mass block 123. The flexible printed circuit board 17 is placed on an extending platform 1111 extending outwards from the casing 116. Two leads 141 of the coil 14 extend through the recess portion 1242 and are electrically connected to the flexible printed circuit board 17.

Figure 4:
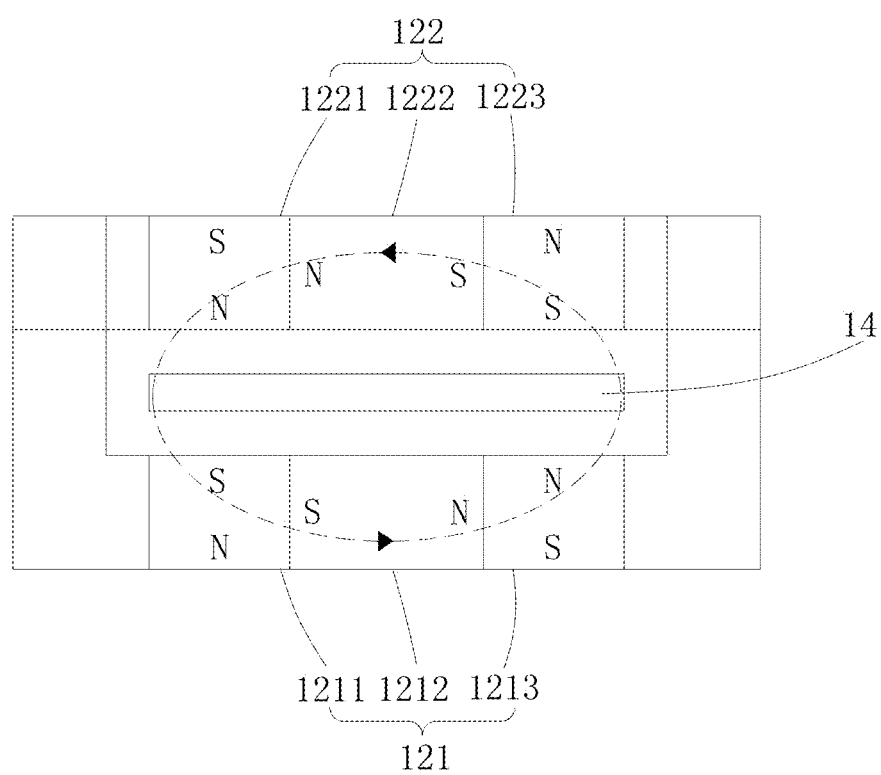
FIG. 4 is a schematic view of a magnetic induction line in the vibration motor of FIG. 1.

Referring also to FIG. 4, the first magnet set 121 and the second magnet set 122 are respectively disposed at two opposite sides of the coil 14 for forming a closed magnetic loop.

The first magnet set 121 includes a first left magnet 1211, a first middle magnet 1212 and a first right magnet 1213. The first left magnet 1211 and the first right magnet 1213 are disposed symmetrically at two sides of the first middle magnet 1212. A magnetized direction of the first left magnet 1211 is opposite to that of the first right magnet 1213.

Similarly, the second magnet set 122 includes a second left magnet 1221, a second middle magnet 1222 and a second right magnet 1223. The second left magnet 1221 and the second right magnet 1223 are disposed symmetrically at two sides of the second middle magnet 1222. A magnetized direction of the second left magnet 1211 is opposite to that of the first right magnet 1213.

The first left magnet 1211 and the second left magnet 1221 are perpendicular to and at two opposite sides of the coil 14 with a same magnetized direction. The first right magnet 1213 and the second right magnet 1223 are also perpendicular to and at two opposite sides of the coil 14 with a same magnetized direction. Furthermore, a magnetized direction of the first left magnet 1211 is opposite to that of the first right magnet 1213, and a magnetized direction of the second left magnet 1221 is opposite to that of the second right magnet 1223.

The first middle magnet 1212 and the second middle magnet 1222 are perpendicular to and at two opposite sides of the coil 14, with a different magnetized direction, and additionally, the magnetized directions of the first middle magnet 1212 and the second middle magnet 1222 are perpendicular to that of the first left magnet 1211, the second left magnet 1221, the first right magnet 1213 and the second right magnet 1223. With the above configuration, a magnetic field generated by the first magnet set 121 and the second magnet set 122 can be ensured to form a closed magnetic loop.

For example, as illustrated in FIG. 4, in this embodiment, an N-pole end of the first left magnet 1211 and an S-pole end of the second left magnet 1221 are both opposite to the coil 14, while an S-pole end of the first left magnet 1211 and an N-pole end of the second left magnet 1221 both face the coil 14. In contrast, an S-pole end of the first right magnet 1213 and an N-pole end of the second right magnet 1223 are both opposite to the coil 14, while an N-pole end of the first right magnet 1213 and an S-pole end of the second right magnet 1223 both face the coil 14. Moreover, an S-pole end and an N-pole end of the first middle magnet 1212 are respectively adjacent to the first left magnet 1211 and the first right magnet 1213, and an N-pole end and an S-pole end of the second middle magnet 1222 are respectively adjacent to the second left magnet 1221 and the second right magnet 1213. As such, the first left magnet 1211, the first middle magnet 1212, the first right magnet 1213, the second right magnet 1223, the second module magnet 1222 and the second left magnet 1221 cooperatively form a closed magnetic loop.

When the vibration motor 1 operates, the coil 14 is provided with a current signal via the flexible circuit board 17 to generate a magnetic field, and the magnet field provides a magnetic force upon the first magnet set 121 and the second magnet set 122. A direction of the current signal changes periodically, and a direction of the driving force acting upon the first magnet set 121 and the second magnet set 122 changes correspondingly, which drives the first mass block 123 and the second mass block 124 to perform reciprocating motion.

In the vibration motor 1 according to the present disclosure, two magnet sets 121 and 122 are disposed parallel to each other at two opposite sides of the coil 14 respectively, and the two magnet sets 121 and 122 work in cooperation with each other to ensure a magnetic field in the vibration motor 1 to form a closed magnetic loop, and thus the vibration motor 1 can provide sufficient driving force to perform vibration feedback for a mobile device While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A vibration motor, comprising:
   a stationary part comprising a housing providing an accommodating space and a printed circuit board placed on an extending platform extending outwards from the housing;
   an elastic connector; and
   a vibration part suspended within the accommodating space by the elastic connector and vibrating along a vibration direction;
   wherein the stationary part comprises a coil and a coil support, the coil support comprises a supporting portion for supporting the coil and a plurality of supporting legs extending from the supporting portion and fixed on the housing, the vibration part comprises a first magnet set and a second magnet set, the first magnet set and the second magnet set are respectively disposed at two sides of the coil to generate a closed magnetic loop; the first magnet set comprises a first left magnet, a first middle magnet and a first right magnet, the second magnet set comprises a second left magnet, a second middle magnet and a second right magnet which are opposite to the first left magnet, the first middle magnet and the first right magnet respectively, the first left magnet and the second left magnet are magnetized along a same direction perpendicular to the vibration direction, the first middle magnet and the second middle magnet are magnetized along two opposite directions parallel to the vibration direction respectively, the first right magnet and the second right magnet are magnetized along a same direction perpendicular to the vibration direction, the magnetic pole of the first left magnet facing the second left magnet is opposite to the magnetic pole of the first right magnet facing the second right magnet, the magnetic pole of the first middle magnet facing the first left magnet is same as the magnetic pole of the first left magnet facing the second left magnet, the vibration part further comprises a first mass block and a second mass block, the first mass block comprises a groove cooperatively formed by a bottom and two sidewalls extending from two opposite sides of the bottom, the second mass block is received in the groove and separated from the bottom, the bottom comprises a first through hole for receiving the first magnet set, the second mass block comprises a second through hole for receiving the second magnet set and a recess portion corresponding to the extending platform, the coil comprises two leads, the two leads extend through the recess portion and are electrically connected to the printed circuit board.

2. The vibration motor of claim 1, wherein the vibration part further comprises a first pole plate attached to a surface of the bottom that is away from the second mass block, and a second pole plate attached to a surface of the second mass block that is away from the bottom.

3. The vibration motor of claim 1, wherein the first mass block and the second mass block are two separate components.

4. The vibration motor of claim 1, wherein the first mass block and the second mass block are formed integrally into a one-piece component.

5. The vibration motor of claim 1, wherein the elastic connector comprises a pair of U-shaped elastic connecting members for suspending two ends of the first mass block to the housing respectively.

6. The vibration motor of claim 5, wherein the vibration motor further comprises a pair of dampers, each of the dampers is positioned between one of U-shaped elastic connecting members of the elastic connector and a corresponding end of the first mass block.

* * * * *